United States Patent
Serini et al.

[11] 3,890,266
[45] June 17, 1975

[54] POLYCARBONATE MIXTURES

[75] Inventors: Volker Serini, Krefeld; Hugo Vernaleken, Krefeld-Bockum; Wolfgang Cohnen, Krefeld, all of Germany

[73] Assignee: Bayer Aktiengesellschaft, Leverkusen Bayerwerk, Germany

[22] Filed: Sept. 26, 1973

[21] Appl. No.: 400,757

[30] Foreign Application Priority Data
Oct. 5, 1972    Germany............................ 2248817

[52] U.S. Cl....... 260/37 PC; 117/126 GB; 260/860; 260/DIG. 24
[51] Int. Cl........................ C08g 39/00; C08g 51/10
[58] Field of Search........... 260/860, 47 XA, 37 PC, 260/77.5, DIG. 24

[56] References Cited
UNITED STATES PATENTS

| | | | |
|---|---|---|---|
| 2,999,835 | 9/1961 | Goldberg........................... | 260/47 X |
| 3,287,442 | 11/1966 | Caldwell et al..................... | 260/860 |
| 3,334,154 | 8/1957 | Kim.................................... | 260/860 |
| 3,422,065 | 1/1969 | Wulff et al......................... | 260/860 |

*Primary Examiner*—Morris Liebman
*Assistant Examiner*—T. Pertilla
*Attorney, Agent, or Firm*—Lawrence S. Pope

[57] ABSTRACT

Mixtures of 10 to 95 parts by weight of polycarbonate of recurring units

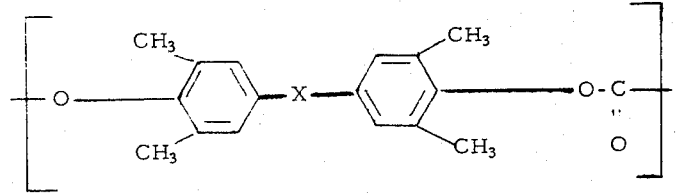

where:

$X = -CH_2-,$

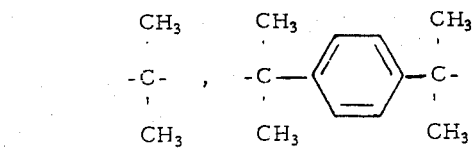

with 90 to 5 parts by weight of homopolycarbonate with recurring units

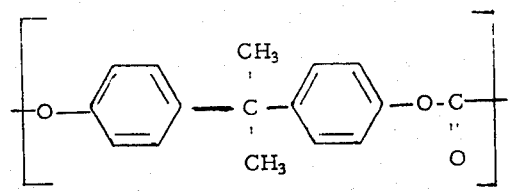

or of copolycarbonate with recurring units

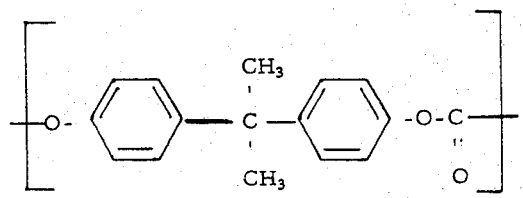

and

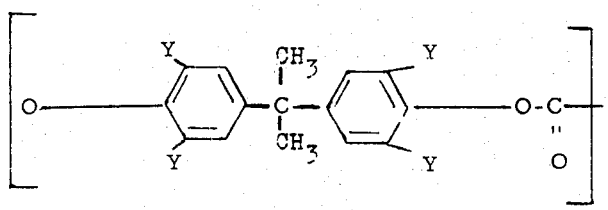

where Y = Cl, Br.

6 Claims, No Drawings

POLYCARBONATE MIXTURES

BACKGROUND OF THE INVENTION

Dt-OS (German Published Specification Nos.) 2,063,050 and 2,063,052 describe polycarbonates based on bis-(3,5-dimethyl-4-hydroxyphenyl)-methane, 2,2-bis-(3,5-dimethyl-4-hydroxyphenyl)-propane and $\alpha,\alpha'$-bis-(3,5-dimethyl-4-hydroxyphenyl)-p-diisopropylbenzene. In contrast to the previously known polycarbonates, for example those based on 2,2-bis-(4-hydroxyphenyl)-propane (bisphenol A, BPA), these polycarbonates are highly resistant to saponification, i.e., resistant to hot aqueous alkali and to hot aqueous mineral acid. Furthermore, they have glass transition temperatures of about 200°C which lie substantially above that of BPA-polycarbonate of 150°C. Hence, they can be employed in many fields in which previously known polycarbonates, such as BPA-polycarbonate, could not be used. However, it has been found that some of the properties of the new polycarbonates are not yet satisfactory. Thus, the impact strength of the new polycarbonates still leaves something to be desired. Furthermore, the melt viscosity is relatively high, which is a disadvantage for thermoplastic processing. Additionally, the melt viscosity increases on thermoplastic processing in the presence of atmospheric oxygen. Additionally, the fire resistance, especially at low wall thicknesses, is not as good as that of BPA-polycarbonate.

SUMMARY OF THE INVENTION

It has now been found, surprisingly, that the said disadvantages of the polycarbonates based on bis-(3,5-dimethyl-4-hydroxyphenyl)-methane, 2,2-bis-(3,5-dimethyl-4-hydroxyphenyl)-propane and $\alpha,\alpha'$-bis-(3,5-dimethyl-4-hydroxyphenyl)-p-diisopropylbenzene may be eliminated by mixing these polycarbonates with BPA-polycarbonate which optionally contains co-condensed 2,2-bis(3,5-dibromo-4-hydroxyphenyl)-propane and 2,2-bis-(3,5-dichloro-4-hydroxyphenyl)-propane. The products of the invention, therefore, are mixtures of 10 to 95 parts by weight of polycarbonate with recurring units

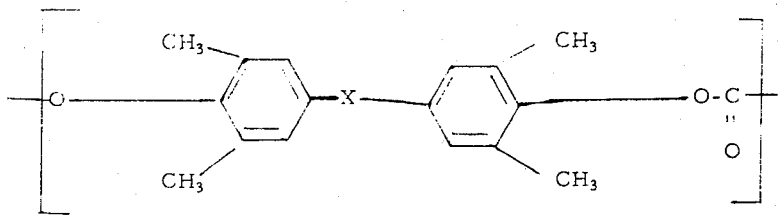

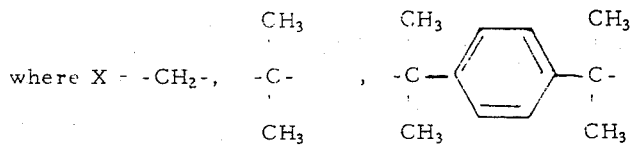

where $X = -CH_2-$, with 90 to 5 parts by weight of homopolycarbonate of recurring units

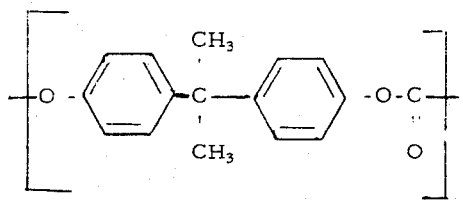

or of copolycarbonate with recurring units

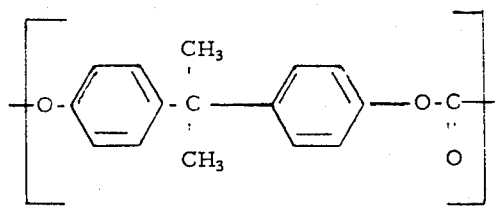

and

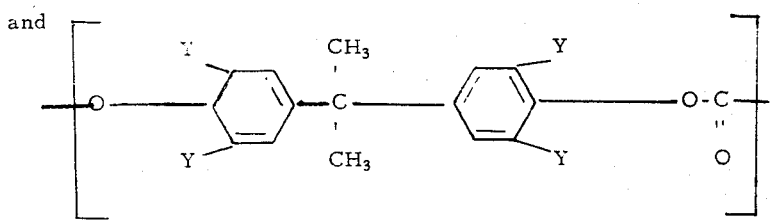

where $Y = Cl, Br$ and where there are at least two units derived from the bisphenol A per halogenated unit.

DETAILED DESCRIPTION

As stated previously the present invention includes mixtures of 10 to 95 parts by weight of polycarbonate based on bis-(3,5-dimethyl-4-hydroxyphenyl)-methane, 2,2-bis-(3,5-dimethyl-4-hydroxyphenyl)propane and α,α'-bis-(3,5-dimethyl-4-hydroxyphenyl)-p-diisopropylbenzene with 90 to 5 parts by weight of BPA-polycarbonate which, optionally, contains co-condensed 2,2-bis-(3,5-dibromo-4-hydroxyphenyl)-propane and 2,2-bis-(3,5-dichloro-4-hydroxyphenyl)-propane. As will be seen from the examples polycarbonates having especially advantageous properties are obtained from mixtures of 30 to 90 parts by weight of the tetramethyl-substituted bisphenol polycarbonates with 70 to 10 parts by weight of the BPA-polycarbonates.

Polycarbonates from the abovementioned tetramethyl-substituted bisphenols are homogeneously miscible in all ratios with the BPA-polycarbonate and with the copolycarbonates of BPA and 2,2-bis-(3,5-dibromo-4-hydroxyphenyl)-propane or 2,2-bis-(3,5-dichloro-4-hydroxyphenyl)-propane.

This was unexpected since small differences in the structure of polymers frequently suffice to cause a complete or at least partial incompatibility in mixtures. An example of such polymers with only slight structural differences and which cannot be mixed homogeneously in all ratios are polystyrene and poly-α-methylstyrene. The polycarbonate mixtures of the invention, because of their homogeneous miscibility, are completely transparent and in each case only show one glass transition temperature. Example 2 lists some of the mixtures according to the invention, with their glass transition temperatures.

The mixtures of this invention show substantially better stability to saponification than is to be expected from the mixing ratio of the initial polycarbonates (see Example 3).

As compared to the homopolycarbonates from the tetramethyl-substituted bisphenols mentioned, the mixtures of the invention show the advantages of a substantial improvement in the impact strength of test specimens (see Example 8) and improved ease of flow of the melt.

The admixture of even relatively small proportions of BPA-polycarbonate prevents the increase in the solution viscosity or in the melt viscosity of the said polycarbonates based on tetramethyl-substituted bisphenols during thermoplastic processing in the presence of atmospheric oxygen (see Example 4). This is a great advantage since on multiple extrusion in the presence of atmospheric oxygen, as can frequently not be avoided in practice (incorporation of glass fibers, stabilizers, dyestuffs, pigments and other additives; reprocessing and the like), a constant viscosity of the melt is thus maintained, which ensures uniform production of the molded articles on repeated extrusion.

If the BPA-polycarbonate, which is related to the polycarbonate mixtures according to the invention, contains co-condensed 2,2-bis-(3,5-dibromo-4-hydroxyphenyl)-propane (TBBPA) or 2,2-bis-(3,5-dichloro-4-hydroxyphenyl)-propane (TCBPA), the advantages described above remain preserved but additionally the fire resistance is increased. The BPA-polycarbonate when co-condensed with TBBPA or TCBPA should contain at least two units derived from BPA per unit derived from TBBPA or TCBPA. It is surprising that substantially smaller amounts of halogen suffice for the mixtures than for BPA-polycarbonate in order to achieve a certain fire resistance, for example Class SE-O according to UL Subj. 94 (see Example 5). Generally as little as about 4% by weight of bromine and 10% by weight of chlorine based on the total weight of polycarbonate will suffice to achieve Class SE-O or SE-I for mixtures containing up to 50% by weight of the tetramethyl-substituted bisphenol polycarbonate. Here one is apparently dealing with a synergistic effect. The $CH_3$ groups, in the o-position to the carbonate groups, of the polycarbonates from the tetramethyl-substituted bisphenols mentioned, are in themselves disadvantageous to the fire resistance (compare Example 5). However, in mixtures with polycarbonates which contain nuclear-halogenated bisphenols, these methyl groups produce a substantial improvement in the fire resistance (compare Example 5), which consists both of a reduced smoldering time after exposure to the flame and also of a reduced tendency to drip. It is to be assumed that the synergistic effect is based on the ease of abstraction of H atoms at the $CH_3$ groups on the nucleus, with the formation of radical positions on the polycarbonate chain.

On incorporation of glass fibers, the polycarbonate mixtures of the invention show improved behavior, relative to BPA-polycarbonate, on climatically controlled storage; thus a decrease in impact strength is barely perceptible even after very long storage at 40°C and 96% relative humidity. The appearance of such polycarbonate mixtures containing glass fibers is also improved relative to corresponding BPA-polycarbonates containing glass fibers. While, for example, BPA-polycarbonate with 20% of glass fibers appears turbid and whitish-grey, the mixtures according to the invention containing additionally 20% of glass fibers are almost transparent or only slightly opaque. Hence a further subject of the invention are the polycarbonates mixtures of the invention containing additionally up to 40 parts by weight of glass fibers referred to the weight of the mixture of polycarbonates.

Two further improvements of the mixtures according to the invention relative to BPA-polycarbonate may additionally be mentioned. The structural viscosity of the mixtures according to the invention is particularly high so that they are very suitable for the extrusion of large hollow articles (see Example 6). Furthermore, their tracking resistance is better than that of the BPA-polycarbonate (see Example 7), which is of importance for a variety of uses in the electrical industry.

The tetramethyl-substituted bisphenol polycarbonates useful in the mixtures of the invention are prepared according to the methods disclosed in Dt-OS 2,063,050 and Dt-OS 2,063,052 by reacting the bis-chlorocarbonic acid esters of the corresponding bis-phenols or by reacting the corresponding bisphenols with phosgene or with the bischlorocarbonic acid esters of the bisphenols in accordance with the phase boundary condensation process, in the presence of aqueous alkali and a solvent suitable for polycarbonates, through the addition of at least 10 mol per cent and up to 200 mol per cent, relative to the bisphenol, of tertiary amine. The subsequent reaction time is chosen so that the product of the amount of amine (mol per cent) and the reaction time (hours) exceeds a value of 15. The process may be carried out in either one step or several steps. For example, the bisphenols are dissolved in aqueous alkali, preferably in sodium hydroxide solution or potassium hydroxide solution, and a suitable solvent for the polycarbonate being produced is added.

Suitable solvents of this nature are generally chlorinated hydrocarbons, such as methylene chloride, chloroform and 1,2-dichloroethane, and also chlorinated aromatics, such as chlorobenzene, dichlorobenzene and chlorotoluene. Phosgene is passed into this mixture with vigorous stirring. In the case of bisphenols which, because of their hydrophobic character, do not produce bisphenolate solutions, a suspension is advantageously employed. The amount of phosgene required depends on the bisphenol employed, the stirring action and the reaction temperature, which can lie between about 10°C and about 60°C, and is in general 1.1–3.0 mols of phosgene per mol of bisphenol. After the phosgenation, which can also be carried out in the presence of chain stoppers, for example 2,6-dimethylphenol, the condensation to give a high molecular polycarbonate is carried out by adding the tertiary amine, for example trimethylamine, triethylamine, dimethylbenzylamine or triethylenediamine, as the catalyst. The amounts of amine are in general 10–200 mol per cent, relative to bisphenols, but preferably 10–50 mol per cent are employed.

The polycarbonates manufactured in the manner described above may be isolated according to known processes, for example by separating off the aqueous phase, repeatedly washing the organic phase with water until it is free of electrolyte, and thereafter precipitating the polycarbonate or evaporating off the solvent.

The BPA-polycarbonate suitable for the invention, which include those in which the BPA has been co-condensed with tetrabromobisphenol A or tetrachlorobisphenol A, may be prepared by any of those techniques known in the art. For example, the polycarbonate may be produced from the corresponding dihydroxy diaryl alkanes and phosgene or the corresponding diester of carbonic acid, for example, as described in Canadian Pat. Nos. 578,585, 578,795 and 594,805 and U.S. Pat. Nos. 3,028,365 and 2,999,835. Other processes contemplated for producing the BPA-polycarbonate include those referred to in "Polycarbonates" by William F. Christopher and Daniel W. Fox.

The polycarbonate mixtures of the invention can be manufactured by mixing the granules of the starting polycarbonates and conjoint extrusion on single-screw or multi-screw extruders. However, they can also be manufactured by mixing the appropriate polycarbonates in solution, for example, in $CH_2Cl_2$ and subsequently evaporating off the solvent. While with the second kind of mixing complete homogeneity is achieved in every case, it is necessary, in the case of the former type of mixing, to ensure that the extruder produces a sufficient mixing action to achieve the completely homogeneous mixing of the polycarbonates.

The polycarbonate mixtures of the present invention can be converted into moldings, films, fibers and coatings. It is possible to mix into them organic and inorganic reinforcing agents and fillers, for example minerals, and also substances producing special effects, pigments, dyestuffs, stabilizers against damage by UV light, heat treatment and oxidation and the like, lubricants, anti-static agents and further auxiliaries. They can be employed in numerous fields in which BPA-polycarbonate has also been used. In addition they can, in particular, be used in fields where stability to saponification, a high glass transition temperature, a high tracking resistance and good structural viscosity of the melt, also in combination with fire resistance, are of importance. Thus they can serve, for example, for the manufacture of pipelines for hot alkaline or acid solutions, of high quality gaskets, of tableware, of articles which can be sterilized by superheated steam, of saponification-resistant coatings and of electrically insulating articles of high tracking resistance, and as dielectrics.

The molecular weights ($\overline{M}_w$, measured by light scattering) of the polycarbonates to be used according to the invention are generally above 20,000. In the case of the manufacture of the mixtures by a melt process, polycarbonates with molecular weights between 30,000 and 80,000 are preferably used. If the mixtures are produced via the solutions, the molecular weights may be higher.

The invention may be more fully understood by referring to the examples that follow.

EXAMPLE 1

Manufacture of polycarbonate from 2,2-bis-(3,5-dimethyl-4-hydroxyphenyl)-propane and its bischlorocarbonic acid ester 22.4 g of sodium hydroxide (0.56 mol) and 22.7 g of 2,2-bis-(3,5-dimethyl-4-hydroxyphenyl)-propane (0.08 mol) are dissolved in 600 ml of water. 100 ml of methylene chloride and 3.0 ml of triethylamine (0.02 mol) are then added while stirring. 49.1 g of the bischlorocarbonic acid ester of 2,2-bis-(3,5-dimethyl-4-hydroxyphenyl)-propane (0.12 mol) dissolved in 500 ml of methylene chloride, are added all at once to the mixture, while stirring vigorously. The mixture is then vigorously stirred for a further 2½ hours. The process is carried out under nitrogen at 20°–25°C. After the subsequent stirring the batch is worked up. The aqueous phase is free of bisphenol. The organic phase is diluted with methylene chloride and is then washed twice with 5% strength aqueous hydrochloric acid and thereafter water until free of electrolyte. The polycarbonate is precipitated from the organic phase to yield 59 g of a white flocculent polycarbonate, the methylene chloride solution of which yields a clear, tough, strong film. The relative viscosity of the polymer is 1.529 (in methylene chloride at 25°C, c = 5g/l). The average molecular weight by light-scattering $\overline{M}_w$ is 83,000 and the glass transition temperature is 206°C.

EXAMPLE 2

Glass transition temperatures of homogeneous polycarbonate mixtures

Polycarbonates of relative viscosity $\eta_{rel} = 1.30$ (0.5 g/100 ml of $CH_2Cl_2$ solution at 25°C) were manufactured in a manner similar to that described in Example 1 and as generally described above (as disclosed in Dt-OS 2,063,050 and 2,063,052) from 2,2-bis-(3,5-dimethyl-4-hydroxyphenyl)-propane, bis-(3,5-dimethyl-4-hydroxyphenyl)-methane and α,α'-bis-(3,5-dimethyl-4-hydroxyphenyl)-p-diisopropylbenzene. The polycarbonates were isolated from the $CH_2Cl_2$ solution as mats by evaporating the solvent on metal sheets. The mats were granulated in a beater mill and the granules were well dried. The resulting polycarbonates were mixed, as a $CH_2Cl_2$ solution, with BPA-polycarbonate ($\eta_{rel} = 1.30$) in the mixing ratios shown in the table. Films were spread from the solutions and after drying the glass transition temperature was determined on the films by differential thermoanalysis. All films were transparent. The granules of two of the polycarbonates (see table) were also mixed in the melt with BPA-polycarbonate granules in various ratios, using a twin-screw extruder at 300°C. These mixtures, again, were transparent. They showed similar glass transition temperatures to the polycarbonates mixed in solution (see table). In the case of all mixtures, only one glass transition temperature could be found.

Table accompanying Example 2:

Glass transition temperatures of homogeneous polycarbonate mixtures

Determination of the glass transition temperature (GTT) by differential thermo-analysis.

PC1 = Polycarbonate from 2,2-bis-(3,5-dimethyl-4-hydroxyphenyl)-propane
PC2 = Polycarbonate from bis-(3,5-dimethyl-4-hydroxyphenyl)-methane
PC3 = Polycarbonate from $\alpha,\alpha'$-bis-(3,5-dimethyl-4-hydroxyphenyl)-p-diisopropylbenzene b. Stability of pieces of film, as in a), in 10% strength aqueous HCl at 100°C.

| Treatment time (hours) | BPA-PC | Properties of the films BPA-PC/PC1 mixture | BPA-PC/PC3 mixture |
|---|---|---|---|
| 500 | b | u | u |

EXAMPLE 4

Stabilization of the polycarbonates from tetramethyl-substituted bisphenols by admixture of BPA-polycarbonate The polycarbonate mixtures listed in the table were manufactured, as described in Example 2, via the melt in a twin-screw extruder, with access of air. They were then repeatedly extruded on a single-screw extruder at

| Mixtures of BPA-PC/PC1 prepared in solution (parts by weight) | GTT (°C) | Mixtures of BPA-PC/PC2 prepared in solution (parts by weight) | GTT (°C) | Mixtures of BPA-PC/PC3 Prepared in solution (parts by weight) | GTT (°C) |
|---|---|---|---|---|---|
| 100/0 | 150 | | | | |
| 70/30 | 170 | 70/30 | 166 | 70/30 | 163 |
| 30/70 | 194 | 30/70 | 188 | 30/70 | 168 |
| 10/90 | 205 | 10/90 | 196 | 10/90 | 186 |
| 0/100 | 210 | 0/100 | 202 | 0/100 | 190 |

| Mixtures of BPA-PC/PC1 prepared in the melt at 300°C (parts by weight) | GTT (°C) | Mixtures of BPA-PC/PC3 prepared in the melt at 300°C (parts by weight) | GTT (°C) |
|---|---|---|---|
| 70/30 | 169 | 70/30 | 164 |
| 30/70 | 194 | 30/70 | 170 |
| 10/90 | 203 | 10/90 | 187 |
| 0/100 | 210 | 0/100 | 190 |

EXAMPLE 3

Stability of polycarbonate mixtures to saponification by hot aqueous NaOH/HCl

300°C, as was the BPA-polycarbonate listed in the table. After each extrusion, the relative viscosities of the polymers were measured.

| Polycarbonate | BPA-PC | PC1 | PC3 | Mixture of BPA-PC/PC1 20/80 parts by weight | Mixture of BPA-PC/PC3 20/80 parts by weight |
|---|---|---|---|---|---|
| $\eta_{rel}$, initially | 1.302 | 1.301 | 1.298 | 1.301 | 1.299 |
| $\eta_{rel}$, 1st extrusion | 1.296 | 1.320 | 1.316 | 1.303 | 1.302 |
| $\eta_{rel}$, 2nd extrusion | 1.292 | 1.343 | 1.335 | 1.304 | 1.302 |
| $\eta_{rel}$, 3rd extrusion | 1.290 | 1.371 | 1.360 | 1.300 | 1.300 |

Table accompanying Example 4: $\eta_{rel}$ = f (number of extrusion passes)
PC1 = see Example 2
PC3 = see Example 2

The films were prepared via the $CH_2Cl_2$ solution, as described in Example 2.

PC1, PC2 = see Example 2.

u = unchanged, tough, b = brittle, decomposes easily, turbid a. Decrease in weight of pieces of film 4 × 5 cm, 70–100 μm thick, weight 150 to 200 mg, in 10% strength aqueous NaOH at 100°C.

EXAMPLE 5

Fire-resistant polycarbonate mixtures

The polycarbonate mixtures contained in the table were manufactured from polycarbonate granules on a twin-screw extruder, as described in Example 2. The copolycarbonates, containing halogen, used for the mixtures, were manufactured in a known manner by

| Treatment time (hours) | BPA-PC | Weight decrease (mg) BPA-PC/PC1 mixture 30/70 parts by weight | BPA-PC/PC3 mixture 30/70 parts by weight |
|---|---|---|---|
| 500 | completely dissolved | 0 | 0 | the two-phase boundary process using such amounts of halogenated bisphenol A that the copolycarbonates and the mixtures manufactured therefrom have the halogen contents indicated in the table which follows.

ing resistance was measured on test specimens of these mixtures and also on test specimens of BPA-polycarbonate ($\eta_{rel} = 1.30$). The results are shown in the table:

| Polycarbonate or PC mixture | Tracking resistance according to VDE 0303, part 1/9.64 (DIN 53,480/6), test solution F, KB-level |
|---|---|
| BPA-PC | 340 V |
| BPA-PC/PC1 mixture, 70/30 parts by weight | >560 V |
| BPA-PC/PC1 mixture, 50/50 parts by weight | >560 V |
| BPA-PC/PC2 mixture, 70/30 parts by weight | >560 V |
| BPA-PC/PC3 mixture, 70/30 parts by weight | >560 V |

PC1 = see Example 2
PC2 = see Example 2
PC3 = see Example 2

Table accompanying Example 5:

| PC or PC mixture | Bromine-chlorine content, % by wt. | $\eta_{rel}$ | Fire test result according to UL Subj. 94 |
|---|---|---|---|
| BPA-PC | 0 | 1.302 | SE II |
| PC1 | 0 | 1.301 | n |
| PC2 | 0 | 1.297 | n |
| PC3 | 0 | 1.298 | n |
| BPA-TBBPA-CPC | 4 | 1.296 | SE II |
| BPA-TCBPA-CPC | 10 | 1.292 | SE II |
| BPA-TBBPA-CPC/PC1 mixture, 50/50 parts by weight | 4 | 1.299 | SE O |
| BPA-TBBPA-CPC/PC2 mixture, 50/50 parts by weight | 4 | 1.303 | SE O |
| BPA-TBBPA-CPC/PC3 mixture, 50/50 parts by weight | 4 | 1.301 | SE O |
| BPA-TCBPA-CPC/PC1 mixture, 50/50 parts BY WEIGHT | 10 | 1.295 | SE I |

PC1 = see Example 2
PC2 = see Example 2
PC3 = see Example 2
TCBPA = 2,2-bis-(3,5-dichloro-4-hydroxyphenyl)-propane
TBBPA = 2,2-bis-(3,5-dibromo-4-hydroxyphenyl)-propane
CPC = copolycarbonate
n = not classified

EXAMPLE 6

Structural viscosity of polycarbonate mixtures

The table contains the melt viscosities of BPA-polycarbonate and of polycarbonate mixtures according to the invention at different speeds of deformation. The polycarbonate mixtures show a substantially greater dependence of the melt viscosity on the speed of deformation than does BPA-polycarbonates. The relative viscosity of the polycarbonates used was 1.30. The melt viscosity was determined in a capillary viscometer.

| | | Melt viscosity at 300°C (P) | | |
|---|---|---|---|---|
| Speed of deformation (D sec$^{-1}$) | BPA-PC | BPA-PC/PC1 40/60 parts by weight | BPA-PC/PC1 20/80 parts by weight | BPA-PC/PC2 20/80 parts by weight |
| $10^1$ | 0.9×10$^5$ | 2.2×10$^5$ | 3.0×10$^5$ | 2.7×10$^5$ |
| $10^2$ | 0.7×10$^5$ | 1.4×10$^5$ | 1.5×10$^5$ | 1.4×10$^5$ |
| $10^3$ | 0.4×10$^5$ | 0.5×10$^5$ | 0.6×10$^5$ | 0.5×10$^5$ |

PC1 = see Example 2
PC2 = see Example 2

EXAMPLE 7

Tracking resistance of polycarbonate mixtures

The mixtures listed in the table were manufactured by mixing polycarbonate granules ($\eta_{rel} = 1.30$) in the melt, using a twin-screw extruder at 300°C. The track-

EXAMPLE 8

Impact strengths of polycarbonate mixtures, compared with those of the starting polycarbonates The polycarbonates of tetramethyl-substituted bisphenols, contained in the table, were mixed with BPA-polycarbonate (see table) in the melt at 300°C on a twin-screw extruder. The following impact strengths were measured on test specimens of the homopolycarbonates and the mixed polycarbonates.

| Polycarbonate or PC mixture | $\eta_{rel}$ | Impact strength (cmkp/cm$^2$) DIN 53,453 | |
|---|---|---|---|
| BPA-PC | 1.30 | nb | (>80) |
| PC1 | 1.30 | 35 | |
| PC2 | 1.30 | 37 | |
| PC3 | 1.30 | 31 | |
| BPA-PC/PC1 mixtures | | | |
| 50/50 parts by weight | 1.30 | nb | (>80) |
| 25/75 parts by weight | 1.30 | nb | (>80) |
| BPA-PC/PC2 mixture | | | |
| 50/50 parts by weight | 1.30 | nb | |
| BPA-PC/PC3 mixture | | | |
| 30/70 parts by weight | 1.30 | nb | (>80) |

PC1, PC2, PC3 = as in Example 2
nb = not broken

What is claimed is:

1. Polycarbonate mixtures comprising, based on the polycarbonate, 10 to 95 parts by weight of polycarbonate of recurring units:

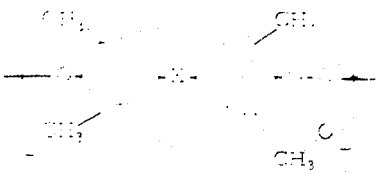

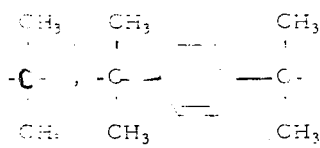

and 90 to 5 parts by weight of (1) homopolycarbonate of recurring units:

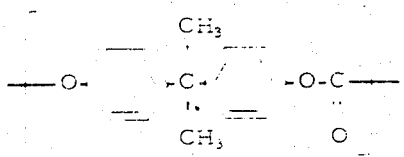

or (2) copolycarbonates of recurring units:

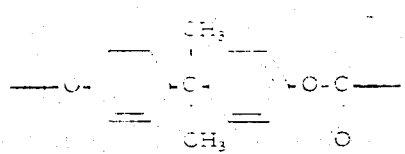

and

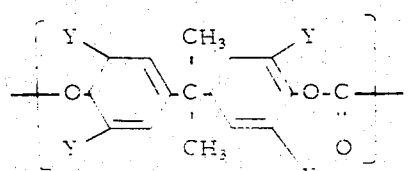

where $Y = Cl, Br$ and wherein there are at least two of the former unit per latter unit, and each of polycarbonates in said mixtures has an average molecular weight, $\overline{M}_w$, above 20,000.

2. The polycarbonate mixtures of claim 1 wherein

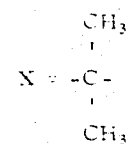

3. The polycarbonate mixtures of claim 1 wherein

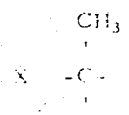

and $Y = Br.$

4. Polycarbonate mixtures according to claim 1 wherein

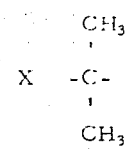

and $Y = Cl.$

5. Polycarbonate mixtures comprising, based on the polycarbonate, 30 to 90 parts by weight of polycarbonate of recurring units:

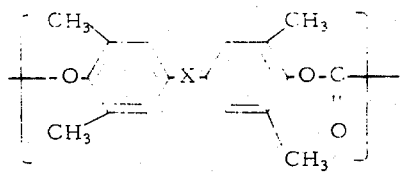

where

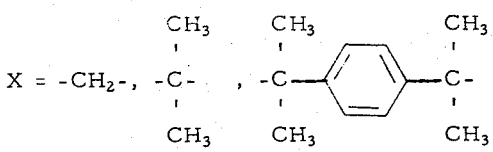

and 70 to 10 parts by weight of (1) homopolycarbonate of recurring units:

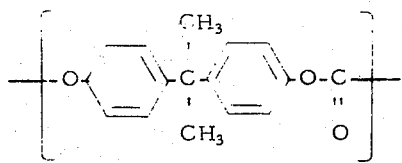

or (2) copolycarbonates of recurring units:

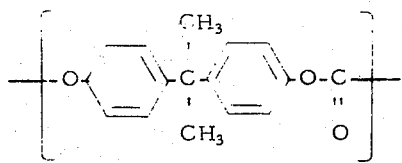

and

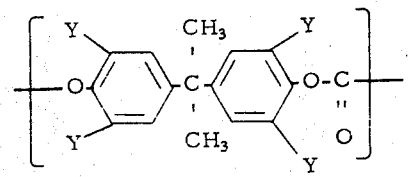

where $Y = Cl, Br$ and wherein there are at least two of the former unit per latter unit, and each of polycarbonates in said mixtures has an average molecular weight, $\overline{M}_w$, above 20,000.

6. The polycarbonate mixtures of claim 1 containing additionally up to 40 parts by weight of glass fibers, referred to the weight of the mixture of polycarbonates.

* * * * *